Patented Sept. 9, 1952

2,610,124

UNITED STATES PATENT OFFICE 2,610,124

PRODUCTION OF QUICK-COOKING RICE

Robert L. Roberts, Piedmont, Calif., assignor to the United States of America as represented by the Secretary of Agriculture No Drawing. Application August 7, 1950, Serial No. 178,163

2 Claims. (Cl. 99—80)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America throughout the world without the payment to me of any royalty thereon.

This invention relates to the preparation of novel food products from rice. In particular it relates to the conversion of ordinary rice into a quick-cooking rice of exceptionally desirable properties.

Rice is used throughout the world and recognized to be a valuable foodstuff. However, the usual rice of commerce has the disadvantage that its cooking requires considerable time and some degree of skill on the part of the cook. The point is that the rice must be cooked to such an extent as to tenderize the grains but the cooking period must not be prolonged to such an extent that the starch granules in the rice burst to produce a sticky product. Usually the proper cooking of rice involves boiling it in water for 30–40 minutes. This period of time may be considerably shortened if the rice is soaked in water prior to cooking. In any event, care is always required to avoid over-cooking thus to prevent formation of an unpalatable sticky product.

The disadvantages of ordinary rice have long been recognized and many methods have been advocated to prepare a pre-cooked, dried rice which can be stirred with hot water to produce in a few minutes, a dish of cooked rice. These procedures involve cooking rice and then drying the cooked grains. Despite much work by skilled investigators, the fact remains that none of the prior techniques is truly satisfactory. The main difficulty is that the pre-cooked, dried products are too dense and require such long periods for rehydration that little advantage is gained over ordinary rice. Another aspect is that in many of the known procedures the pre-cooked, dried product contains a large proportion of misshapen, broken, and checked grains. This makes the product unattractive in appearance and lowers the price it can command in the open market.

I have now found that if rice is subjected to a particular sequence of steps, as hereinafter described, the rice is converted into products of novel and desirable properties. The products can be readily prepared for the table by mixing them with boiling water and allowing to stand for a brief period of time, i. e., about 30 seconds to 5 minutes. The products thus exhibit a very high rate of rehydration. These products consist almost wholly of unbroken grains of rice in a pre-cooked dried condition. The individual grains are separate and are porous in structure, each individual grain being of the same shape as the original grains but larger in volume (1.5 to 3 times the volume of the original rice), the expansion being caused by the formation of a multitude of small spheroidal voids uniformly dispersed throughout each rice grain. The original rice material is thus changed from a dense, hard material into a light porous material which is capable of rapid rehydration. Further, when my products are rehydrated by contact with hot water, the individual grains remain separate even to a greater extent than properly cooked raw rice.

The novel products in accordance with this invention are produced as follows:

The raw, white rice is first soaked in water. It is usually convenient to use a somewhat elevated temperature to accelerate rehydration of the rice grains, thus the temperature of soaking may be from about 20° C to about 65° C. Generally, the soaking is carried out for about 30 minutes, the aim being to increase the moisture content of the grains to about 30%.

The soaked rice is then cooked. This cooking operation may be done with steam at atmospheric or superatmospheric pressures. Usually, it is most convenient to simply boil the grains in water. This operation results in an alteration of the rice material whereby the grains become swollen and soft with additional uptake of water, these changes being mainly due to the gelatinization of the starch in the grains. This cooking operation may be carried out to the extent of essentially complete cooking, i. e., establishment of rice grains soft enough to be edible containing 60–65% water. However, I prefer to limit the time of cooking so that the moisture content of the grains is about 45 to 55%, such result being obtained by boiling the soaked grains for about 30 seconds to about 5 minutes. Cooked grains of such moisture content are more adaptable to further handling in my process as the individual grains show little tendency to cohere and since their moisture content is relatively low, the subsequent drying operation can be accomplished more rapidly and at lower cost. A slight amount of clumping may occur during drying but the grains can readily be broken apart by the application of moderate pressure or gentle rolling. If desired, the soaking period may be omitted in which case the time of steaming or boiling will necessarily be longer.

The cooked rice is then drained and dried. I have found that this drying operation is critical and in order to produce the novel products as herein described, this operation must be carried out as follows:

Two factors are significant in this drying operation. The first is the method of drying and the second is temperature. The method of drying involves simultaneous drying and puffing while suspended in an air stream. Thus the cooked grains are placed in a duct through which hot air is forced at such a velocity that the grains are continuously tumbled about in the air stream while they are undergoing drying. Normally the duct is positioned in a vertical plane with the blast of hot air entering the bottom of the duct. The rice grains tumble about in the duct and gradually rise to the top of the duct as their density becomes attenuated due to expansion and expulsion of steam. A convenient apparatus of this type consists of an elongated, vertically disposed chamber provided with an inlet for hot air at the bottom and an outlet for spent air and product at the top. A screen is provided near the bottom of the inlet pipe to prevent rice from entering the air inlet pipe if the air pressure drops. In using such an apparatus, the cooked rice is placed on the screen and the hot air introduced into the chamber at such velocity that the kernels tumble about in the air stream. As the heat treatment proceeds the kernels expand and become buoyant and are carried by the air stream out of the chamber into a separator, such as a cyclone, where the kernels are separated from the air stream.

With regard to temperature, the drying is accomplished in two stages. In the first stage the cooked grains are subjected to a relatively high temperature air blast to complete the cooking of the rice grains and to cause a rapid formation of steam within the cooked grains thus forming a multitude of small, uniform voids throughout the grains. The rate of heating is such that the steam is formed within the grains before the water can gradually escape as vapor, and the pressures thus generated at a multitude of points within the grains cause the numerous voids which give the product its porosity. In this treatment, the air temperature should be from about 170° C. to about 250° C., preferably around 200° C. and should be applied for a brief period of time, i. e., about 30 seconds to about 2 minutes. After the grains have been rendered porous, the temperature of the air blast is reduced to a lower temperature, i. e., about 100° C. to about 150° C. to complete the drying of the product. The final moisture content of the product should not be more than 15%, say 5 to 15%, and this level of moisture content is usually attained in the air suspension dryer in a few minutes with the air blast at the reduced temperature.

It is to be noted that my use of high temperature drying is a radical departure from previous practice. Thus all prior techniques involve the use of low temperature drying—the temperature usually being 140° C. or less, it being thought that high temperatures would cause scorching of the rice grains. I have found however that contrary to accepted practice, the high temperature drying not only does not cause scorching but actually gives a beneficial effect. The situation may be explained as follows: when the cooked grains are subjected to relatively low temperature (140° C. or less) drying, the grains tend to become case-hardened because the outer layers are dried more rapidly than the inner layers. As a result the grains are covered with this hardened layer of starchy material which reduces the absorptive properties of the product in that when the product is rehydrated for use water can penetrate but slowly through this hard layer. Further, this low-temperature drying is not conducive to preparing a truly porous product as in most cases the grains each have one centrally disposed, longitudinal void or collapse to a hard glassy mass of gelatinized starch. On the other hand, my high temperature drying causes such a rapid expulsion of steam from the cooked grains that a porous product is produced rapidly before any case hardening can occur. This extremely rapid expulsion of steam results in the formation of a multitude of small, uniform voids or bubbles dispersed throughout each grain. As a result my product has a truly sponge-like texture and has a high capacity for water absorption. Further, the process of rapid steam expulsion also results in the rapid formation of well-shaped grains which do not shrink or become malformed. Thus in carrying out my drying step, I first use a high temperature to cause this rapid expulsion of steam whereby to create the sponge-like grains. After this point is reached the temperature of the air stream is reduced since such high temperature is no longer required and also to avoid browning of the rice grains. Consequently after the proper degree of porosity is reached, the drying is finished at essentially conventional temperature levels.

The following examples illustrate the invention in greater detail. It is understood that these examples are furnished only by way of illustration and not limitation.

Example I

Raw, polished California pearl rice (100 grams) was soaked in 200 ml. of warm water (50° C.) for 30 minutes. The soaked rice was drained then boiled in water for 2 minutes. The cooked rice was drained then dried in an air suspension drier. The temperature of the air stream was maintained at 200° C. for 1.5 minutes then maintained at 130° C. for 1.5 minutes. The white porous grains of quick-cooking rice were obtained in a yield of about 90%.

Example II

One hundred grams of raw, polished Patna rice (long-grain southern rice) was soaked in 200 ml. of warm water (50° C.) for 30 minutes. The soaked rice was drained then boiled in water for 2 minutes. The cooked rice was drained, then dried in an air suspension drier. The temperature of the air stream was maintained at 200° C. for 1 minute then maintained at 130° C. for 1 minute. The white, porous, quick-cooking product was obtained in a yield of about 90%. The bulk density of the product was 0.49 gram/c. c. whereas the bulk density of the original rice was 0.88 gram/c. c.

To prepare for use, 50 grams of the above product was added to 200 grams of boiling water and the mixture simmered for 5 minutes. The excess water was drained from the thus prepared ready-to-eat rice dish. This dish was appraised by a panel of qualified food tasters along with a sample of freshly cooked Patna rice and a sample of a commercially available quick-cooking rice. The following decision was reached by the panel:

*Separation of grains.*—The product in accordance with this invention was judged to be better than both the freshly cooked rice and the commercial quick-cooking rice.

*Flavor.*—The flavor of the product of this invention was equal to that of the freshly cooked rice and better than that of the commercial quick-cooking rice.

Having thus defined my invention, I claim:

1. The process of preparing a quick-cooking rice which comprises subjecting cooked rice having a moisture content of about from 45 to 55% to a stream of air at a temperature from about 170° C. to about 250° C., the velocity of the air stream being sufficient to tumble the rice grains about and suspend them in the stream, the rapid expulsion of steam under such conditions causing the formation of a partly dried product in which a multitude of small spheroidal voids is uniformly dispersed throughout each grain of rice, then subjecting this partly dried, porous product to an air stream at a temperature from about 100° C. to about 150° C. and completing the drying under such conditions.

2. The process of preparing a quick-cooking rice which comprises soaking raw rice in water, cooking the soaked rice until its moisture content is about from 45 to 55%, subjecting the cooked rice to a stream of air at a temperature from about 170° C. to about 250° C., the velocity of the air stream being sufficient to tumble the rice grains about and suspend them in the stream, the rapid expulsion of steam under such conditions causing the formation of a partly dried product in which a multitude of small spheroidal voids is uniformly dispersed throughout each grain of rice, then subjecting this partly dried, porous product to an air stream at a temperature from about 100° C. to about 150° C. and completing the drying under such conditions.

ROBERT L. ROBERTS.

REFERENCES CITED

The following references are of record in the file of this patent:

UNITED STATES PATENTS

| Number | Name | Date |
|---|---|---|
| 460,051 | Koyl | Sept. 22, 1891 |
| 545,120 | Cummer | Aug. 27, 1895 |
| 1,317,215 | Pennock | Sept. 30, 1919 |
| 1,759,702 | Koon | May 20, 1930 |
| 2,350,209 | Clark et al. | May 30, 1944 |
| 2,438,939 | Ozai-Durrani | Apr. 6, 1948 |

FOREIGN PATENTS

| Number | Country | Date |
|---|---|---|
| 579,981 | Great Britain | Aug. 22, 1946 |